US005173589A

United States Patent [19]

Diehl et al.

[11] Patent Number: 5,173,589

[45] Date of Patent: Dec. 22, 1992

[54] PROCESS FOR INSTANTANEOUS CONFIRMATION OF ACTIONS IN RELATION TO TELEVISION PROGRAMS AND DEVICE FOR USE OF THE PROCESS

[75] Inventors: Eric Diehl, Neudorf; Jöel Hamon, Lipsheim; Michel Leduc, Boersch, all of France

[73] Assignee: Laboratoire Européen de Recherches Electroniques Avancees, Societe En Nom Collectif, Courbevoie, France

[21] Appl. No.: 606,835

[22] Filed: Oct. 31, 1990

[30] Foreign Application Priority Data

Nov. 3, 1989 [FR] France ............................... 89 14415

[51] Int. Cl.[5] ........................ H04N 7/00; H04N 7/087

[52] U.S. Cl. ....................................... 235/375; 358/84

[58] Field of Search ............... 235/381, 382, 375, 492; 380/16, 10; 358/349, 84

[56] References Cited

U.S. PATENT DOCUMENTS 4,796,297 1/1989 Okamoto ............................. 380/16

4,926,255 5/1990 Von Kohorn ........................ 358/84

FOREIGN PATENT DOCUMENTS 309326 3/1989 European Pat. Off. .

333570 9/1989 European Pat. Off. .

8504543 10/1985 World Int. Prop. O. .

*Primary Examiner*—John W. Shepperd

*Attorney, Agent, or Firm*—Oblon, Spivak, McClelland, Maier & Neustadt

[57] ABSTRACT

To allow teleshopping to be performed quickly and reliably via the television network, receivers (3) are equipped with smart card readers (4), and the transmitter (2) sends information which is processed in the smart cards by means of the viewers' control devices (6). The result of this process is displayed on the screen and communicated later to the transmitter. This result allows the viewers' reactions to be authenticated.

16 Claims, 1 Drawing Sheet

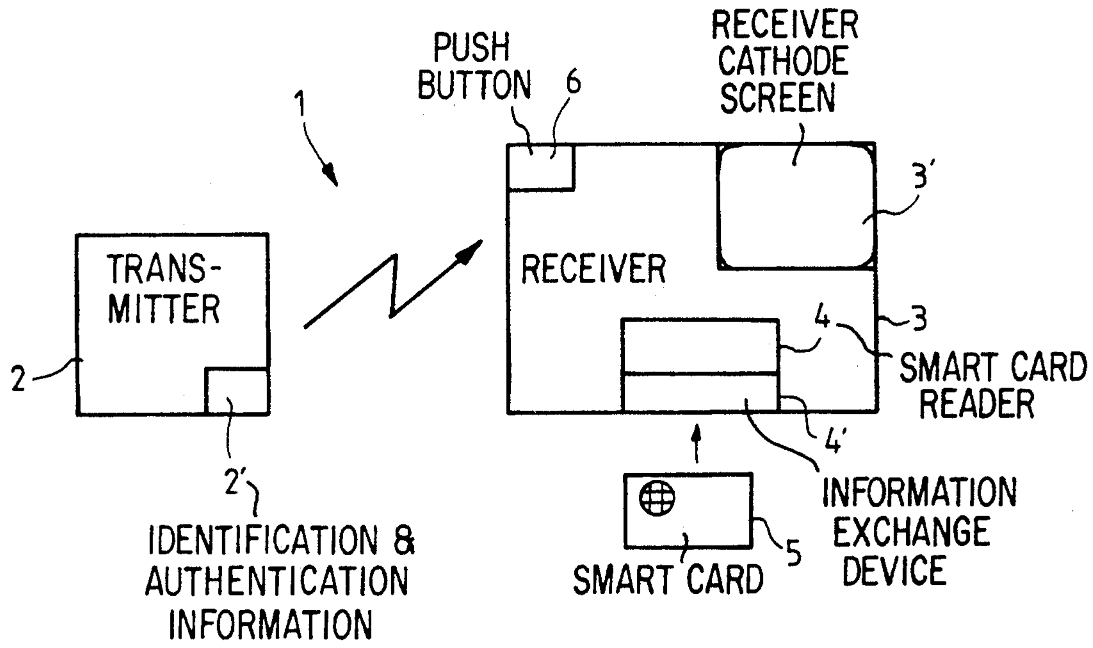
1
TRANS-
MITTER
2
2'
IDENTIFICATION &
AUTHENTICATION
INFORMATION
PUSH
BUTTON
6
RECEIVER
CATHODE
SCREEN
3'
RECEIVER
4
3
SMART CARD
READER
4'
INFORMATION
EXCHANGE
DEVICE
SMART CARD
5

PROCESS FOR INSTANTANEOUS CONFIRMATION OF ACTIONS IN RELATION TO TELEVISION PROGRAMS AND DEVICE FOR USE OF THE PROCESS

BACKGROUND OF THE INVENTION

This invention relates to a process for the instantaneous validation of actions in relation to TELEVISION programs and a device for the use of this process.

Teleshopping as it is practiced today by television broadcasters, generally consists in presenting, during a specialized program, a variety of articles and asking viewers interested in these articles to phone a Sales Agency, and if necessary to give their bank card number.

This process is neither rapid nor reliable, since telephone calls last a certain time which means that callers will be discouraged by the difficulty in obtaining a reply during busy periods, and the origin of the calls will not be identified.

Furthermore, this process does not allow viewers wishing to participate in games requiring an immediate response or a response at a precise time to do so. Nor does it indicate whether all the viewers having replied to the questions asked during the program were actually watching the program.

The object of this invention is a process allowing definite and instantaneous validation of an act in relation to television programs. More particularly, the object of this invention is a process whereby a large number of viewers will be able to buy almost immediately the article(s) they are interested in, and broadcasters will have the guarantee that a maximum number of viewers interested in buying articles will in fact be able to order those articles.

A further object of this invention is a process for the validation of actions in relation to television programs which will allow at least a certain number of the viewers to participate in games and contests and give replies to the questions asked during the programs at a given time, as required and irrefutably, and at the same time allowing program producers or distributors to know rather precisely that the viewers replying to the questions asked during the program were in fact watching that program.

An additional object of this invention is a device for the use of the aforesaid process, which is to be both simple and as reliable as possible.

SUMMARY OF THE INVENTION

The process, in accordance with the invention, for use in a television network in which the receivers are equipped with smart card readers, consists in sending via the transmitter for a lapse of time during which viewers are likely to react to the programs, at least one piece of information which makes it possible to authenticate, at defined times, the reaction of the viewers who are interested, and who, by their reaction, provoke the confidential processing of this information in their smart card; this processing results in another piece of information which they send later on to the transmitter.

An advantageous aspect of this process is that the information sent by the transmitter includes data to identify the program, the date and, with further evolution, data to identify viewers and to authenticate their reactions.

In accordance with the invention, the television network broadcaster has the necessary means to produce data for authentication, and such data comprise data to identify program content, date, and possibly select viewers. In the relevant receivers of this network, the smart card reading device has the means to exchange information with the smart cards and the means to control a display of the data presented by the smart cards which operate with the reading device.

BRIEF DESCRIPTION OF THE DRAWINGS

This invention will be more clearly understood by means of the detailed description of a mode of embodiment taken as a non-restrictive example and illustrated by the appended figure which is a simplified block diagram representing a television network in accordance with the invention.

DESCRIPTION OF THE PREFERRED EMBODIMENT

The television network 1 which is represented in the diagram comprises an transmitter 2 and a large number of receivers. Only one of these receivers, referenced 3, has been represented in this figure.

The receiver 3, in addition to its usual circuits, consists of a smart card reader 4. A typical card 5 has been represented in the diagram.

The transmitter 2 has a device 2' which produces the data for identification and authentication as described in detail above.

All the receivers in network 1 are not necessarily equipped with a smart card reader, but, preferably, the majority are, as is for example the receiver 3. The reader 4 corresponding to the receiver 3 has, besides its usual circuits, an information exchange device 4' which operates with card 5, and a message display control device, for example via the receiver cathode screen 3'.

First, a description of the method will be given which allows viewers, whose receivers are equipped with reading devices similar to reader 4, to do their teleshopping.

During a teleshopping program, the hosts present one or several articles. When the presentation is over, one of the employees of the broadcasting station is in charge of producing, by means of device 2, the first piece of encrypted information $I1=ID+D+X$ which is immediately sent via the same transmitter 1 used for program broadcasting. In the expression given for I1, ID is a data item allowing the presented article to be identified, and in other cases, indicating the price and/or optional characteristics (color, size). D is the current date, and possibly the current time. "X" is data allowing the selection of a certain group of viewers (with respect to a region, to a socio-professional category, etc) in the case where only a certain category of viewers are to participate in the program. The information I1 may implicitly integrate components ID and D: this may be a number evolving in relation to time according to a law which makes it possible to deduce a given instant knowing the value of I1 at that particular instant, and, in addition, the value of I1 may vary according to the articles presented, their price, etc.

The information I1 operates with the authentication data of the user of receiver 3 which is memorized in a protected part of card 5 storage (this data can be neither read nor modified from outside the card). This authentication data is, for example, that of an algorithm controlling the combinatorial process acting on information I1, producing a process which is unique for each card thus allowing the owner of the card to be identified. The result of the combination is displayed on the screen 3 by pressing push-button 6 on the receiver 3. This result will be called "Y". Due to the fact that the number Y was obtained by means of a secret combinatorial process, it is possible to state that this number allows the highest possible level of security as regards the authenticity of the card process and its action.

When a viewer is interested in the article presented and wishes to order it, he immediately presses push-button 6 on the receiver 3. The screen 3' displays the Y value corresponding to this article immediately as the push-button 6 is pressed.

The card 5 may have a credit value (pre-paid when the card was bought) which is now debited by the amount corresponding to the price of the article ordered, or by a partial amount of the price. The viewer can communicate the Y number either at a later date (by mail, phone, viewdata systems, etc) or immediately, if there exists a return line between the receiver 3 and the transmitter 2 (cable network, modem, etc) in order to receive the ordered article. In such cases, his bank account is debited (by indicating the number of his credit card, for example) by the amount corresponding to the price of the article, or that remaining to be paid (if part of the price has already been debited on the card 5).

This invention therefore allows viewers to order instantaneously the article of their choice without having to wait for the telephone to be free in order to call the broadcasting station. For the television program distributors it assures that a maximum number of viewers interested in articles can place their order and that these orders are genuine.

This invention also makes it possible for games and surveys to be organized in which all viewers with receiver, such as receiver 3, may participate. In this case, the simple push-button 6 will be replaced by a data keyboard connected to the receiver 3. The information I1 will then consist of components related to the games and the replies to be given: in addition to D and ID components there could exist other components related to the replies of multiple choice questions. The reply or replies produce(s) Y corresponding numbers which viewers transmit to the broadcasting center after having played. In some cases, to avoid adding a data keyboard, and continue using the simple push-button 6, it would be possible to present multiple choice questions and then present the possible replies at different instants which are sufficiently separated in time to allow for the reaction time of the viewers, and to modify the information I1 for each of these instants. Thus, with different I1 values producing different corresponding Y values for the different possible replies to a question one of which must be confirmed by the viewers by pressing the push-button 6.

The information I1 is transmitted as known in the art via the lines which are not used by the video frame image from transmitter 2.

What is claimed is:

1. A method for instantaneous confirmation of viewer's reactions in relation to television programs implemented in a television network including a transmitter and a plurality of receivers, wherein at least half of the receivers are equipped with smart card readers, comprising the steps of:

sending a least one piece of information for allowing authentication of a viewer's reaction via said transmitter to said plurality of receivers during a time lapse in which viewers are likely to react to a program;

receiving said at least one piece of information at said plurality of receivers equipped with smart card readers;

processing said at least one piece of information sent by said transmitter in accordance with data stored in respective said smart cards at said plurality of receivers; and producing a second piece of information as a result of said processing in accordance with said data stored in respective said smart cards, wherein said second piece of information identifies a particular viewer and authenticates the particular viewer's reaction in relation to a television program.

2. The method according to claim 1, further comprising the step of communicating said second piece of information to said transmitter.

3. The method according to claim 1, wherein the authentication of the viewer's reactions is performed at defined instants.

4. The method according to claim 1, wherein the information sent by the transmitter contains data identifying the program being viewed, and the date.

5. The method according to claim 4, wherein the data item allowing the authentication of the viewer's reaction also allows the authentication of the viewer's identity.

6. The method according to claim 4, wherein the data item allowing authentication of the viewer's reactions may vary with time.

7. The method according to claim 1, wherein the information sent by the transmitter comprises a data item used to select specific viewer categories.

8. The method according to claim 1, wherein the information sent by the transmitter is included in the lines not used for video frame image transmission.

9. The method according to claim 1, wherein the method is used for teleshopping.

10. The method according to claim 1, wherein the method is used for television games.

11. The method according to claim 1, wherein the method is used for surveys.

12. The method according to claim 1, wherein the method is used for betting.

13. The method according to claim 1, wherein the method is used for lotteries.

14. A device for the instantaneous confirmation of viewer's reactions in relation to television programs, comprising:

a television network transmitter; and a plurality of receivers each equipped with a smart card reader, wherein the transmitter produces authentication data in relation to program content.

15. The device according to claim 14, wherein said authentication data contain data to identify program content and the date.

16. The device according to claim 14, wherein each said smart card reader includes means to exchange information via a smart card and means to control display of data developed by the smart card operating with the reading device.

* * * * *